United States Patent
Remy et al.

Patent Number: 5,387,341
Date of Patent: Feb. 7, 1995

[54] DISK-TYPE OIL COLLECTOR

[76] Inventors: Helmut L. Remy, R. Marie Satzke, 140; Carlos W. Von Wieser, Marie Satzke 106, both of Sao Paulo, Brazil

[21] Appl. No.: 171,231

[22] Filed: Dec. 21, 1993

[51] Int. Cl.$^6$ ............................................. E02B 15/04
[52] U.S. Cl. .................................. 210/523; 210/242.1; 210/242.3; 210/242.4; 210/923; 210/924
[58] Field of Search ............... 210/242.1, 242.3, 242.4, 210/776, 923, 924, 170, 538, 540, 523

[56] References Cited

U.S. PATENT DOCUMENTS

| | | | |
|---|---|---|---|
| 3,623,609 | 11/1971 | Ainlay | 210/242.3 |
| 4,264,450 | 4/1981 | Ayers et al. | 210/242.4 |
| 4,336,167 | 6/1982 | Byers | 210/242.3 |
| 4,360,249 | 11/1982 | Morris | 210/242.3 |
| 4,368,122 | 1/1983 | Ravagnan | 210/242.3 |
| 4,473,469 | 9/1984 | Ayroldi | 210/242.3 |
| 5,043,064 | 8/1991 | Abell et al. | 210/242.1 |
| 5,718,414 | 6/1992 | Byers | 210/158 |

*Primary Examiner*—Christopher Upton

[57] ABSTRACT

The present invention relates to an improved disk-type oil collector which is provided with at least one alignment of oleophile disks. Each oleophile disk of the at least one alignment of oleophile disks is furnished with at least one surrounding rim whose peripheral edge is provided with a plurality of teeth. The surrounding rim is connected to the periphery of the oleophile disk by means of an annular sector.

6 Claims, 1 Drawing Sheet

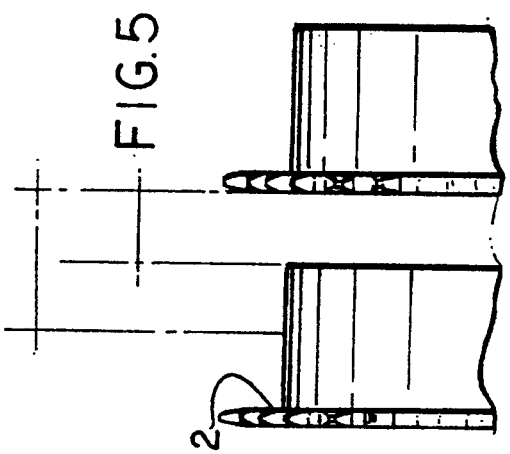
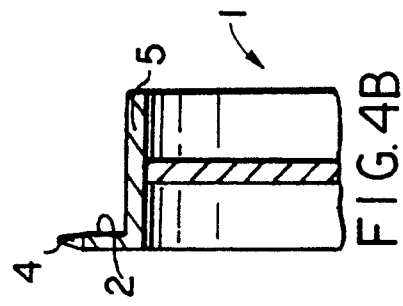
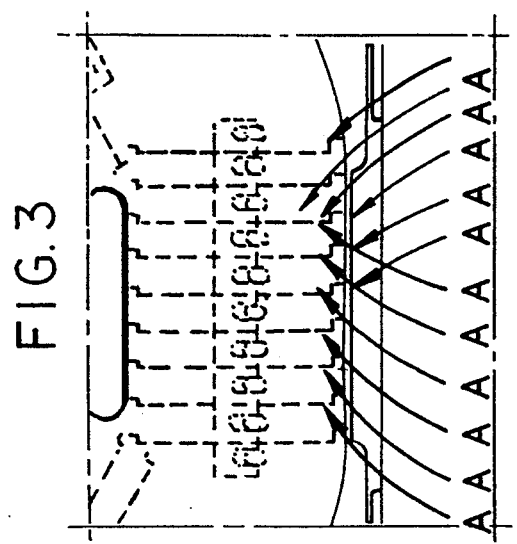
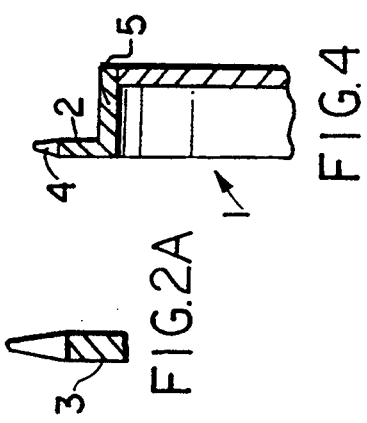
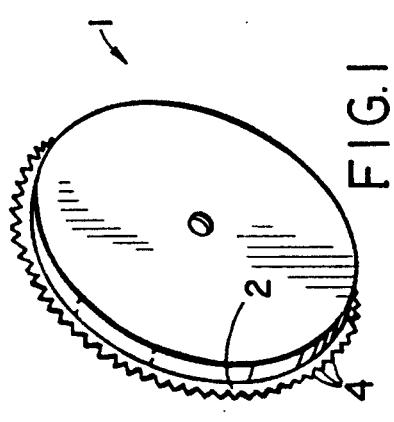
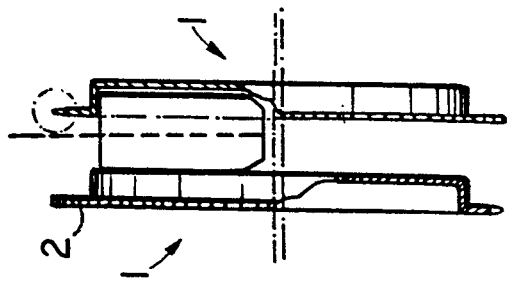

DISK-TYPE OIL COLLECTOR

BACKGROUND OF THE INVENTION

The present specification relates to improvements introduced in a disk-type oil collector designed to recover oil or thick liquids spilt on water.

As is known to those skilled in the art, many types of equipment are used to collect oil when spilt on water, mainly those that employ a plurality of oleophile disks suitably disposed on shafts driven by their own motors, with these disks being held partially immersed in water and enabling collection of the floating oil clinging to the surfaces of each disk which, when rotating, deposits it on stationary scrapers that direct the flow of the collected oil.

This type of equipment, though widely used, only displays satisfactory rates of efficiency in limited operating conditions, with this same efficiency being severely affected when the oil to be collected is accompanied by solid floating matter, such as leafs, rubble, chips of wood in general and an interminable variety of other types of trash.

As a rule, this oil-floating debris is equally directed to the oleophile disks, in view of the flow given rise to by the actual collection of oil caused by rotation of the said disks.

It so happens that, above a given size, these solid residues begin to interfere with the proper operation of the equipment, colliding with the disks in rotary motion and blocking the free circulation of oil to the disks.

It is quite common for this floating trash to impair the operation of the suction pumps drawing in the oil collected by the disks and retrieved by the scrapers, often causing the overall breakdown thereof and disabling equipment that, almost always and in spite of its limitations, performs an especially important job.

SUMMARY OF THE INVENTION

One object of the present invention is to provide an improvement in disk-type oil collectors that will enable them to operate perfectly even when the oil collected carries an amount of solid floating debris in sizes that would normally be detrimental to their operation.

Another object of the present invention is to provide an improvement in disk-type oil collectors that will, at a low cost, enable the said collectors to perform with better features, even in such adverse conditions as when solid floating matter is present.

Finally, a further object of the present invention is to provide a disk-type oil collector with means to prevent solid floating matter from being drawn in together with the oil, in such circumstances as to jeopardize perfect operation of the equipment.

In view of the limitations displayed by conventional equipment and to achieve the proposed objects, an improved disk-type oil collector has been developed, as described in the present invention, comprising at least one alignment of oleophile disks, each provided with at least one integral serrated rim.

BRIEF DESCRIPTION OF THE INVENTION

The present invention will now be described with reference to the attached drawings, wherein:

FIG. 1 is a perspective view of a single disk;

FIG. 2 is a schematic of the relative positions between two oil-collecting disks;

FIG. 3 is a schematic of the serrated rim relative to the oil lines flowing toward the disks;

FIG. 4 is a partial cutaway of one constructive embodiment of the collector disk;

FIG. 4a is a second constructive embodiment of the subject disk;

FIG. 4b is a third constructive embodiment of the subject disk; and

FIG. 5 is schematic of the positions of two disks showing the reduction of the front oil input space from "E" to "e".

DETAILED DESCRIPTION OF THE PREFERRED EMBODIMENTS

According to what is illustrated in the aforementioned figures, the improved disk-type oil collector of the present invention is characterized in that each oleophile disk I is furnished with a surrounding rim 2 whose peripheral surface 3 is provided with a plurality of teeth 4, with the said surrounding rim 2 having, in its more central portion, an annular sector 5 to provide a mechanical link between the said surrounding rim 2 and the periphery of the oleophile disk 1.

FIGS. 4 and 4a illustrate two different positions for the annular sector 5 relative to the periphery of the oleophile disk 1, wherein, in FIG. 4, same is axially displaced so that its periphery will coincide with the periphery of the said disk 1, while FIG. 4a illustrates the position of the annular sector 5 so that the periphery of disk i is located at an intermediate point of the width of the said annular sector 5.

The surrounding rim ensures that there will be a continuous flow of oil, even in the presence of solid floating matter, in fragmentary and mobile condition, without "choking" the oil intake of the disks.

FIG. 4b illustrates a secondary variant of the embodiment shown in FIG. 4a, in which the two edges of the annular sector 5 are provided with surrounding rims 2.

Collection of the floating oil is performed in a conventional manner, with the scraper skimming the two vertical surfaces of the disk i to remove the oil clinging thereto.

It so happens that, with the introduction of the present improvements, the path of the solid floating matter, which normally follows the flow of the oil being collected, will run through the active area of the surrounding rims 2, being then diverted by the teeth 4 and not disturbing oil circulation within the equipment pipes and pumps, and preventing the occurrence of clogging or damage.

FIG. 3 shows that the oil will flow toward the surfaces of each disk on a slanted path, as illustrated by the arrows "A".

As shown by the attached drawings, the annular sector 5 of each disk 1 functions as a support for the surrounding rim 2 and as a restriction for the front trash input area between the said oleophile disks 1.

It should be noted that the teeth 4 provided on the surrounding rims 2 may be designed in different ways to fit the particular characteristics of the most common types of floating solid matter to be found in a given operating section of the present improved equipment for the collection of oil.

The drawings presented herein illustrate a few preferred embodiments for the disks comprising the subject oil-collecting equipment and should be regarded as being of an explanatory but not limiting nature.

What is claimed is:

1. An improved disk-type oil collector comprising at least one alignment of oleophile disks, wherein each oleophile disk of said disks is furnished with at least one surrounding rim whose peripheral edge is provided with a plurality of teeth, with the said surrounding rim being connected to the periphery of the oleophile disk by means of an annular sector.

2. An improved disk-type oil collector according to claim 1, wherein the periphery of the annular sector, carrying the surrounding rim, is rigidly connected to the periphery of the oleophile disk.

3. An improved disk-like oil collector according to claim 2, wherein the peripheral edge provided with teeth is positioned on the annular sector at a point where it interferes with the path of the solid trash flowing toward the surfaces of the oleophile disks.

4. An improved disk-type oil collector according to claim 1, wherein the annular sector is disposed so that the periphery of the oleophile disk is rigidly positioned at a point midway between the two peripheral edges of the annular sector.

5. An improved disk-like oil collector according to claim 4, wherein the peripheral edge provided with teeth is positioned on the annular sector at a point where it interferes with the path of the solid trash flowing toward the surfaces of the oleophile disks.

6. An improved disk-like oil collector according to claim 1, wherein the peripheral edge provided with teeth is positioned on the annular sector at a point where it interferes with the path of the solid trash flowing toward the surfaces of the oleophile disks.

* * * * *